(12) United States Patent
Green

(10) Patent No.: US 6,288,513 B1
(45) Date of Patent: Sep. 11, 2001

(54) ROTOR POSITION DETECTION IN SWITCHED RELUCTANCE MACHINES

(75) Inventor: Charles Edward Brandon Green, St. Louis, MO (US)

(73) Assignee: Switched Reluctance Drives Limited, Harrogate (GB)

( * ) Notice: Subject to any disclaimer, the term of this patent is extended or adjusted under 35 U.S.C. 154(b) by 0 days.

(21) Appl. No.: 09/480,029

(22) Filed: Jan. 10, 2000

(30) Foreign Application Priority Data

Jan. 11, 1999 (GB) .................................................. 9900534

(51) Int. Cl.⁷ ....................................................... H02P 5/28
(52) U.S. Cl. .......................... 318/700; 318/254; 318/652; 318/138
(58) Field of Search .................................. 318/254, 138, 318/652, 700

(56) References Cited

U.S. PATENT DOCUMENTS

| | | | |
|---|---|---|---|
| 4,777,419 | * 10/1988 | Obradovic ............................ | 318/696 |
| 5,140,244 | * 8/1992 | Lyons et al. .......................... | 318/701 |
| 5,589,751 | * 12/1996 | Lim ....................................... | 318/701 |
| 5,689,165 | * 11/1997 | Jones et al. ........................... | 318/701 |
| 5,864,217 | * 1/1999 | Lyons et al. .......................... | 318/652 |
| 5,920,175 | * 7/1999 | Jones et al. ........................... | 318/701 |
| 5,929,590 | * 7/1999 | Tang ..................................... | 318/701 |
| 5,955,861 | * 9/1999 | Jeong et al. .......................... | 318/701 |

FOREIGN PATENT DOCUMENTS 0 573 198 A1   12/1993  (EP) .

OTHER PUBLICATIONS

Lyons, J.P. et al., "Flux/Current Methods for SRM Rotor Position Estimation" Proceedings of the Industry Applications Society Annual Meeting, U.S., New York, IEEE, 1991, pp. 482–487.

Green et al., "A Sensorless Switched Reluctance Drive", EMD97, Sep. 1–3, 1997, pp. 64–68, Conference Publication No. 444, IEE 1997.

Russa, K. et al., "A Self–Tuning Controller for Switched Reluctance Machines", Department of Electrical Engineering, University of Akron, IEEE 1998, pp 1269–1275.

Ray, W.F., et al., "Sensorless Methods for Determining the Rotor Position of Switched Reluctance Motors", European Power Electronics Association, 1993, pp. 7–13.

Stephenson, J.M., et al., "The Characteristics, Design and Applications of Switched Reluctance Motors and Drives", Seminar 5, PCIM Conference, Jun. 21–24, 1993, pp. 1–68.

* cited by examiner

*Primary Examiner*—Robert E. Nappi
*Assistant Examiner*—Rita Leykin
(74) *Attorney, Agent, or Firm*—Dicke, Billig & Czaja, P.A.

(57) ABSTRACT

A polyphase switched reluctance machine is controlled by a control system using sensorless position detection. A method of operating the machine at high speeds interrogates every nth phase reference point to allow sufficient time for computations of position to be carried out, where n is an integer greater than one.

24 Claims, 6 Drawing Sheets

ROTOR POSITION DETECTION IN SWITCHED RELUCTANCE MACHINES

BACKGROUND OF THE INVENTION

1. Field of the Invention

The present invention relates to rotor position detection in switched reluctance machines, particularly those machines which are operated without a sensor to measure rotor position.

2. Description of Related Art

In general, a reluctance machine is an electrical machine in which torque is produced by the tendency of its movable part to move into a position where the reluctance of a magnetic circuit is minimized, i.e. where the inductance of the exciting winding is maximized. In one type of reluctance machine, circuitry is provided for detecting the angular position of the rotor and energizing the phase windings as a function of the rotor position. This type of reluctance machine is generally known as a switched reluctance machine. It may be operated as a motor or a generator. The characteristics of such switched reluctance machines are well-known and are described in, for example, "The Characteristics, Design and Application of Switched Reluctance Motors and Drives" by Stephenson and Blake, PCIM '93, Nürnberg, Jun. 21–24, 1993, incorporated herein by reference. That paper describes the features of the switched reluctance machine which together produce the characteristic cyclically varying inductance of the phase windings.

FIG. 1 shows the principal components of a typical switched reluctance drive system. The input DC power supply 11 can be either a battery or rectified and filtered AC supply and can be fixed or variable in magnitude. The DC voltage provided by the power supply 11 is switched across the phase windings 16 of the motor 12 by a power converter 13 under the control of the electronic control unit 14. The switching must be correctly synchronized to the angle of rotation of the rotor for proper operation of the drive. A rotor position detector 15 is typically employed to supply signals indicating the angular position of the rotor. The output of the rotor position detector 15 may also be used to generate a speed feedback signal. Current feedback is provided in the controller 14 by a current transducer 18 which samples current in one or more of the phase windings.

The rotor position detector 15 may take many forms; for example it may take the form of hardware, as shown schematically in FIG. 1. In some systems, the rotor position detector 15 can comprise a rotor position transducer that provides output signals that change state each time the rotor rotates to a position where a different switching arrangement of the devices in the power converter 13 is required. In other systems, the position detector can be a software algorithm which calculates or estimates the position from other monitored parameters of the drive system. These systems are often called "sensorless position detector systems" since they do not use a physical transducer associated with the rotor which measures the position. As is well-known in the art, many different approaches have been adopted in the quest for a reliable sensorless system.

The energization of the phase windings in a switched reluctance machine depends on detection of the angular position of the rotor. This may be explained by reference to FIGS. 2 and 3, which illustrate the switching of a reluctance machine operating as a motor. FIG. 2 generally shows a rotor 24 with a rotor pole 20 approaching a stator pole 21 of a stator 25 according to arrow 22. As illustrated in FIG. 2, a portion 23 of a complete phase winding 16 is wound around the stator pole 21. When the portion 23 of the phase winding 16 around stator pole 21 is energized, a force will be exerted on the rotor, tending to pull rotor pole 20 into alignment with stator pole 21. FIG. 3 generally shows typical switching circuitry in the power converter 13 that controls the energization of the phase winding 16, including the portion 23 around stator pole 21. When switches 31 and 32 are closed, the phase winding is coupled to the source of DC power and is energized. Many other configurations of lamination geometry, winding topology and switching circuitry are known in the art: some of these are discussed in the Stephenson and Blake paper cited above. When the phase winding of a switched reluctance machine is energized in the manner described above, the magnetic field set up by the flux in the magnetic circuit gives rise to the circumferential forces which, as described, act to pull the rotor poles into line with the stator poles.

In general, the phase winding is energized to effect rotation of the rotor as follows. At a first angular position of the rotor (called the "turn-on angle", $T_{ON}$), the controller 14 provides switching signals to turn on both switching devices 31 and 32. When the switching devices 31 and 32 are on, the phase winding is coupled to the DC bus, causing an increasing magnetic flux to be established in the machine. The magnetic flux produces a magnetic field in the air gap which acts on the rotor poles to produce the motoring torque. The magnetic flux in the machine is supported by the magnetomotive force ("mmf") which is provided by a current flowing from the DC supply through the switches 31 and 32 and the phase winding 16. Current feedback is generally employed and the magnitude of the phase current is controlled by chopping the current by rapidly switching one or both of switching devices 31 and/or 32 on and off. FIG. 4(a) shows a typical current waveform in the chopping mode of operation, where the current is chopped between two fixed levels. In motoring operation, the turn-on angle $T_{ON}$ is often chosen to be the rotor position where the center-line of an inter-polar space on the rotor is aligned with the center-line of a stator pole, but may be some other angle.

In many systems, the phase winding remains connected to the DC bus (or connected intermittently if chopping is employed) until the rotor rotates such that it reaches what is referred to as the "freewheeling angle", $T_{FW}$. When the rotor reaches an angular position corresponding to the freewheeling angle (e.g., the position shown in FIG. 2) one of the switches, for example 31, is turned off. Consequently, the current flowing through the phase winding will continue to flow, but will now flow through only one of the switches (in this example 32) and through only one of the diodes 33/34 (in this example 34). During the freewheeling period, the voltage drop across the[] phase winding is small, and the flux remains substantially constant. The circuit remains in this freewheeling condition until the rotor rotates to an angular position known as the "turn-off angle", $T_{OFF}$, (e.g. when the center-line of the rotor pole is aligned with that of the stator pole). When the rotor reaches the turn-off angle, both switches 31 and 32 are turned off and the current in phase winding 23 begins to flow through diodes 33 and 34. The diodes 33 and 34 then apply the DC voltage from the DC bus in the opposite sense, causing the magnetic flux in the machine (and therefore the phase current) to decrease. It is known in the art to use other switching angles and other current control regimes.

As the speed of the machine rises, there is less time for the current to rise to the chopping level, and the drive is normally run in a "single-pulse" mode of operation. In this mode, the turn-on, freewheel and turn-off angles are chosen as a function of, for example, speed and load torque. Some systems do not use an angular period of freewheeling, i.e. switches 31 and 32 are switched on and off simultaneously. FIG. 4(b) shows a typical such single-pulse current waveform where the freewheel angle is zero. It is well-known that the values of turn-on, freewheel and turn-off angles can be predetermined and stored in some suitable format for retrieval by the control system as required, or can be calculated or deduced in real time.

Many sensorless position detection systems are reviewed and categorized in "Sensorless Methods for Determining the Rotor Position of Switched Reluctance Motors", Ray et al., Proc. EPE '93 Conference, Brighton, UK, Sep. 13–16, 1993, Vol. 6, pp. 7–13, which is incorporated herein by reference. It concluded that none of the methods was satisfactory for operation over the entire operating range. One of the known methods for operating in the high-speed (i.e. single-pulse) mode is described in EP-A-0573198 ("Ray") (also incorporated herein by reference), which discloses a method of flux and current measurement leading to predictions of rotor position.

A problem common to most sensorless position detection methods is that the computations required to predict the rotor position take a finite amount of time. With the microprocessors and digital signal processors commercially available, this time is generally short compared with a phase period when the machine is in the chopping mode. However, as the speed of the machine rises, the mode of operation changes to the single-pulse mode, the phase period becomes shorter and there eventually comes a speed at which the computations can no longer be carried out in time for correct operation of the machine to be continued. This difficulty has been widely reported by researchers, e.g. in "A Self-Tuning Controller for Switched Reluctance Machines" by Russa et al., PESC 98, 29th Annual IEEE Power Electronics Specialists Conference, Fukuoka, Japan, May 17–22, 1998, Vol. 2, pp. 1269–1275, which is incorporated herein by reference.

SUMMARY OF THE INVENTION

It is an object of this invention to provide a reliable and economic sensorless position detection method for a switched reluctance drive which can operate at high speeds. The present invention is generally applicable to switched reluctance machines operating as motors or generators.

According to embodiments of the invention there is provided a method of rotor position detection for a switched reluctance machine having a rotor, a stator, a plurality of phase windings and means for detecting rotor speed, the rotor being movable relative to the stator according to a cyclic variation of magnetic properties of each phase, the method comprising: defining a reference position of the rotor relative to the stator in each cyclic variation of the magnetic properties; sampling at least one characteristic of the machine at an estimate of the time of reaching one of the reference positions; deriving a rotor position from the sampled characteristic(s); advancing the rotor beyond a subsequent reference position and sampling the at least one characteristic again to allow further time for a subsequent derivation of the rotor position.

A switched reluctance machine works on the principle that the magnetic properties of the machine are cyclic with the rotor pole pitch. The magnetic properties can be defined by reference to the inductance of the phase winding or the flux linkage generated by the winding.

Embodiments of the invention provide the option to skip one or more reference positions, thus deferring the moment when a rotor position has to be derived. As the speed of the machine increases the range of a given processing capability can be extended as well because the time available for processing at higher speeds is increased to compensate. The invention is not necessarily speed dependent. The reference position can be skipped as part of the control regime of the motor without reference to speed. However, the preferred embodiment includes defining a set of speed ranges for the rotor, including a low speed range and at least one high speed range; determining into which speed range the rotor speed falls; and advancing beyond the subsequent reference position if the rotor speed falls into the high speed range.

The advance is preferably an integer number of reference positions.

The speed ranges may include a first high speed range, the value of the advance of the subsequent reference position according to the first high speed range being a fraction of one phase inductance cycle. For example, the fraction is $1/n$ where n may be the number of phases.

The speed ranges may also include a second high speed range, the value of the advance of the subsequent reference position according to the second high speed range being one or more phase inductance cycles.

The rotor speed can be derived by reference to the sampled characteristic(s) or independently from it.

Embodiments of the invention also extend to a switched reluctance drive system including a stator having a plurality of phase windings; a rotor movable relative to the stator;means for determining rotor speed; arid a controller programmed with a reference position of the rotor relative to the stator in each cyclic variation of the magnetic properties of each phase of the machine, the controller having means for deriving a rotor position from at least one sampled characteristic of the machine; and means for sampling the at least one characteristic of the machine at an estimate of the time of reaching one of the reference positions, the controller further being operable to advance the rotor beyond a subsequent reference position and to enable the means for sampling thereafter to allow further time for subsequent derivation of the rotor position.

Also according to embodiments of the invention there is provided a method of determining rotor position in a switched reluctance machine comprising a stator, a rotor and a plurality of phase windings, when operated in a single-pulse mode, the method comprising: defining a reference position of the rotor relative to the stator in each cyclic variation of magnetic properties of the machine; sampling at least one characteristic of the machine at an estimate of the time of reaching every nth reference point where n is equal to or greater than 2; and deriving the rotor position from the sampled characteristic(s).

Preferably, n is a variable number. It may desirably vary according to the speed of the rotor so that the choice of reference position is made to allow time for the processing of data according to the speed of the rotor.

BRIEF DESCRIPTION OF THE DRAWINGS

The invention can be put into practice in a number of ways, some of which will now be described by way of example with reference to the accompanying drawings in which.

DETAILED DESCRIPTION OF PREFERRED EMBODIMENTS

Figure 1:
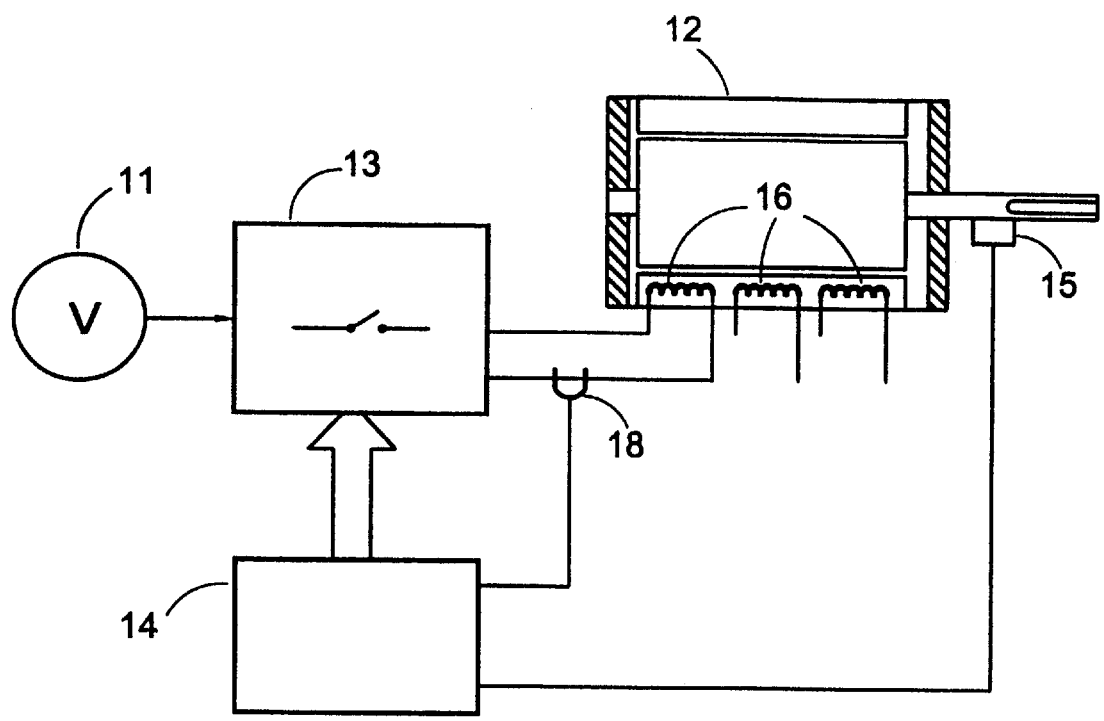
FIG. 1 shows the principal components of a switched reluctance drive system.
Figure 2:
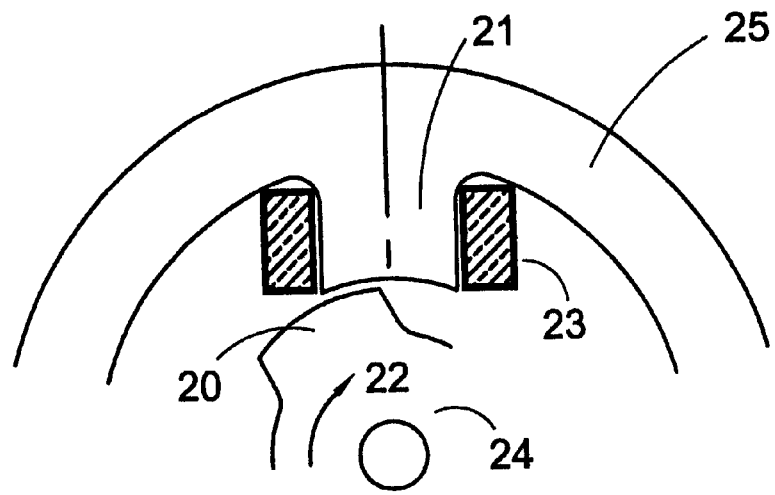
FIG. 2 shows a schematic diagram of a rotor pole approaching a stator pole.
Figure 3:
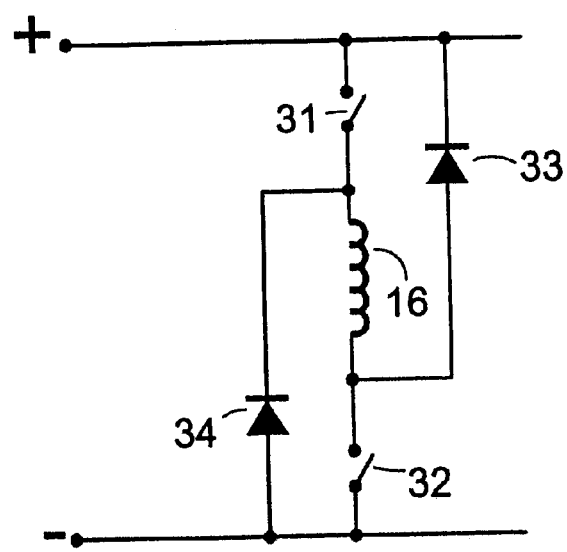
FIG. 3 shows typical switching circuitry in a power converter that controls the energization of the phase windings of the machine of FIG. 1.
Figure 4A:
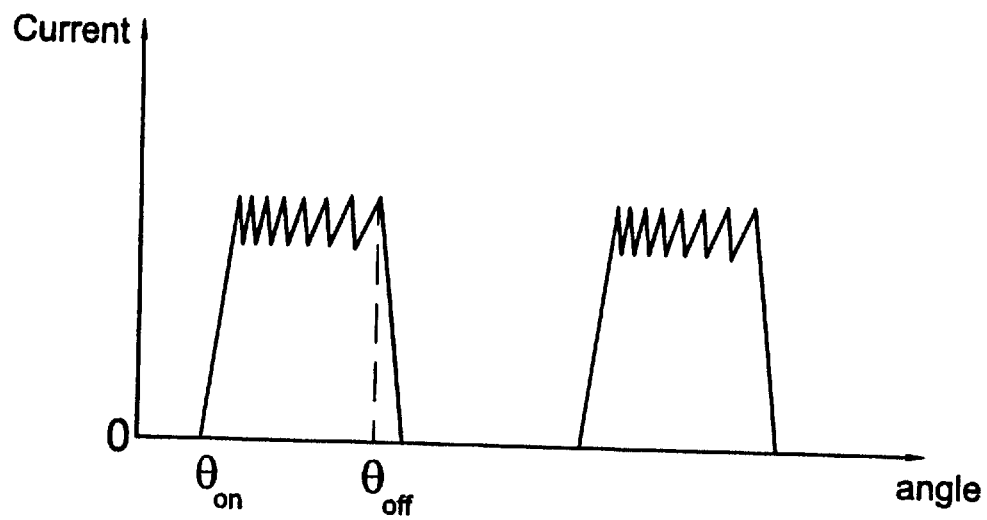
FIGS. 4(a) and 4(b) illustrate typical current waveforms of a switched reluctance drive operating in chopping and single-pulse modes respectively.
Figure 4B:
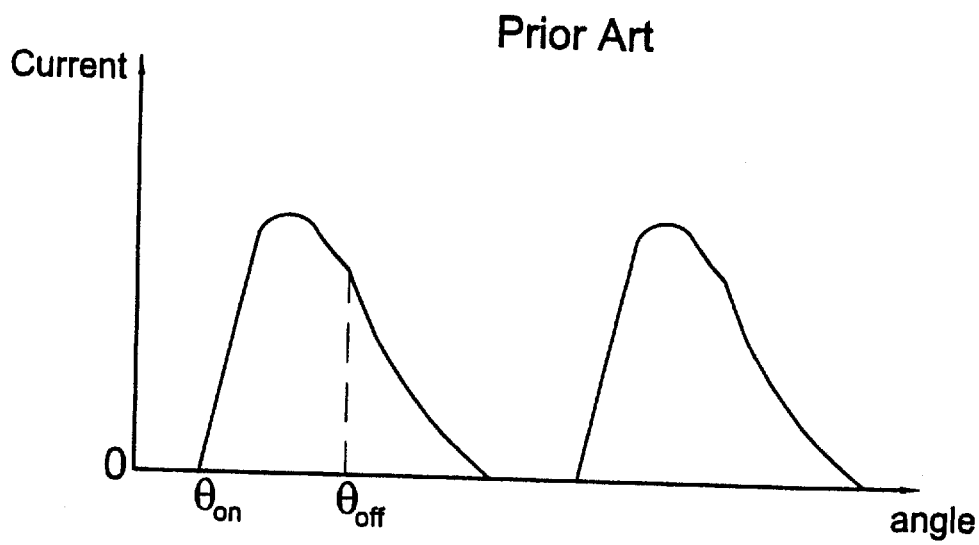
Figure 6:
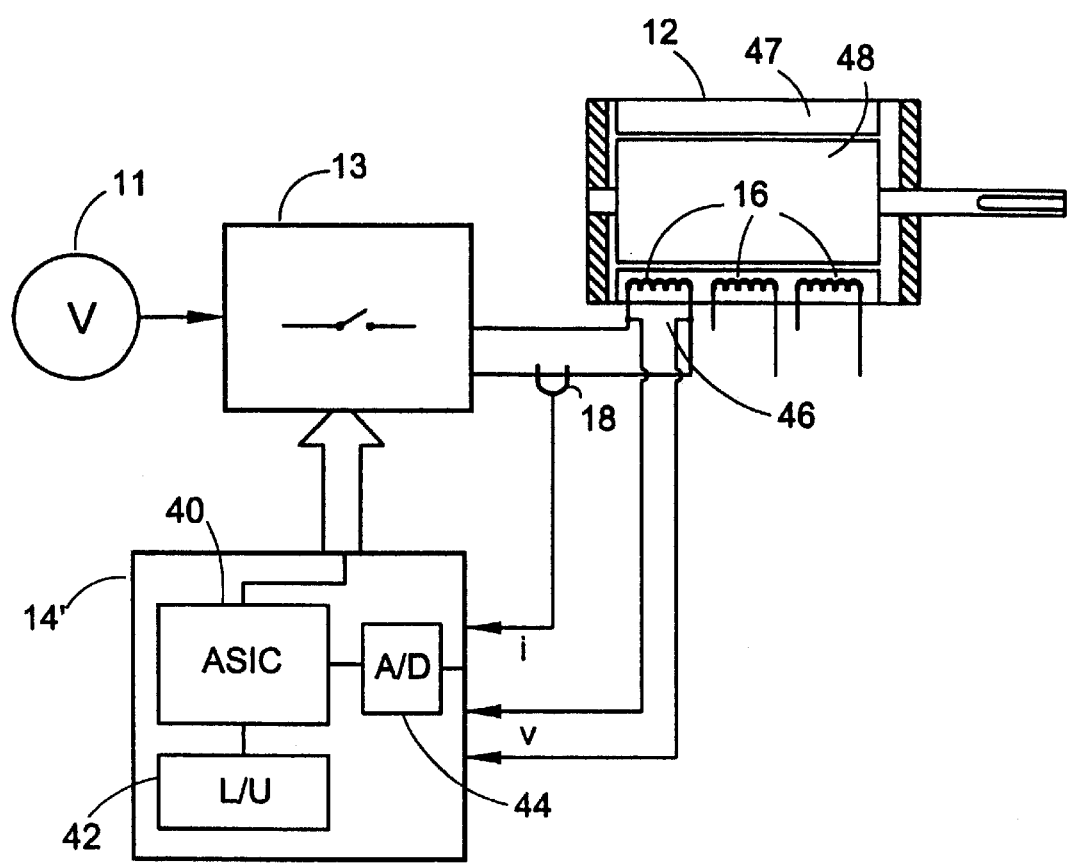
FIG. 6 is a schematic block diagram of a switched reluctance drive embodying the invention.

FIG. 6 illustrates a schematic circuit diagram of a switched reluctance drive system in which embodiments of the invention are incorporated. The circuit is based on that in FIG. 1 and like reference numerals have been used where appropriate. Further description of the common components will not be repeated here, but it will be noted that the rotor position detection is of the sensorless type as the circuit lacks the rotor position transducer 15 of FIG. 1.

The controller 14' comprises an Application Specific Integrated Circuit ("ASIC") 40 which includes a microprocessor which is operably linked to a look-up table 42 and to an A/D converter 44. The A/D converter multiplexes signals received from the current transducer 18 and a voltage sensing device 46 which is arranged to monitor the voltage across one of the phase windings 16. It will be appreciated that a separate A/D converter could be used for each phase to handle these inputs.

In this embodiment the method of the invention incorporates a technique of sensorless operation of switched reluctance machines, e.g. the single-pulse mode described by Ray in EP-A-0573198. The methods of measurement used for flux linkage and current described in that disclosure are suitable, though any other suitable methods could be substituted—e.g. the current can be measured by non-isolated means, as commonly used for low-cost drive systems, or the flux linkage measurement could be obtained by other analytical or computational technique. It will be apparent that the invention is equally applicable to sensorless techniques other than that described by Ray. The invention enables greater speeds to be controlled by a given sensorless technique, in which the limit on speed would otherwise be determined by the speed of processing data in the controller.

In the single-pulse mode, data is normally gathered once on the inductance cycle of each phase since, in a polyphase machine, the phase inductance cycles overlap. Thus, for a given inductance cycle each phase will be interrogated in turn. An angular reference point is predetermined and current and flux linkage are measured when it is anticipated that the rotor will be at this position. Any error between the measured and expected flux linkage is used to derive a positional error and hence a revised estimate of position. The estimate of position can be used as the basis of a calculation of speed and/or acceleration. The arrangement is shown schematically in FIG. 5, where LA, LB and LC denote the idealized inductance profile(s of a 3-phase machine and Ref A, Ref B and Ref C denote the reference angles for the three phases for motoring operation. Motoring and generating operation can be catered for by exploiting the symmetry of the magnetic characteristics of the machine, so that data corresponding to only half the inductance profile need be stored. Alternatively, data can be stored explicitly for both modes.

Figure 7:
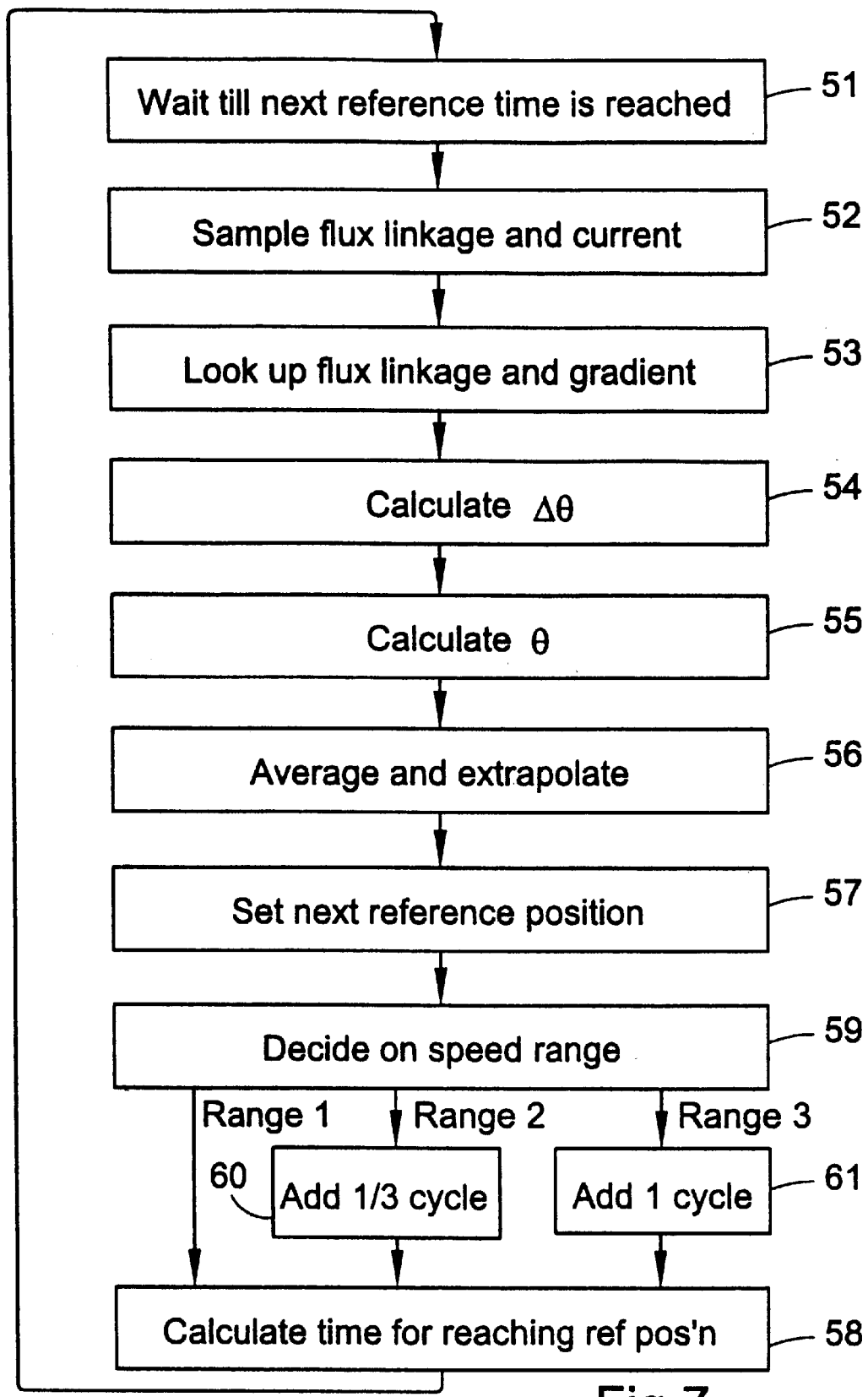
FIG. 7 shows a flow chart describing the control of a machine operated over a wide range of speeds in single-pulse mode according, to the invention.

The single-pulse method is explained in more detail in relation to FIG. 7, which shows a flow chart of the steps which are used in a microprocessor-based implementation of the method. This particular implementation uses a low-cost microprocessor, but those skilled in the art will realize that the method could be implemented in slightly different steps to yield the same effect, or could be implemented with other control devices such as digital signal processors, etc. Furthermore, an equivalent analog circuit implementing the method could also be used. Step 51 shows the control system waiting until an interrupt is received which indicates that the rotor is expected to be at a predetermined reference angle. Step 52 samples the flux linkage and current at the moment the rotor is considered to be at the reference angle and stores these values for use in the calculations below. The flux linkage, $\psi_m$, may conveniently be estimated by integrating the emf applied to the phase winding:

$$\psi_m = \int (V - iR) \tag{1}$$

where V is the supply voltage less any device drops, i is the instantaneous phase current and R is the phase resistance. Alternatively, it can be estimated by integrating the DC link voltage and using a knowledge of switch states to control the integrator. Current can be measured by an isolated current transducer of known type or by measurement of voltage drop over a component (e.g., resistor, switching device, etc) in the circuit. The value is converted to digital words by the A/D converter 44 and stored in registers.

Step 53 uses the measured value of current to look up the expected value of flux linkage, $\psi_{ref}$, and the gradient of angle with flux linkage, $d\theta/d_{104}$, at the reference angle. The appropriate values are held in one or more look-up tables and are read out in a conventional way. Step 54 calculates the angular error, $\Delta\theta$, between the angle at the time the readings are taken and the reference position:

$$\Delta\theta = d\theta/d_\psi (\psi m - \psi_{ref}) \tag{2}$$

This angular error can then be used in Step 55 to calculate the true value of rotor angle:

$$\theta = \theta_{ref} \pm \Delta\theta$$

where the positive sign is taken for motoring operation and the negative sign for generating.

Sensorless position detection systems generally have to operate in electrically noisy environments close to power switching devices, and this often leads to corruption of the measurements of flux linkage and current, leading to the calculation of spurious positional data. In order to improve the robustness of the system, a method of checking the validity of the calculated positional data has been developed. This technique is carried out in Step 56. Each time a new position is calculated, the values of position, time and speed can be stored. Using the last n stored values, a predicted position can be extrapolated for comparison with the newly calculated one. If the newly calculated and predicted values do not agree within a predetermined amount, an error count is incremented and the predicted value used in place of the calculated one: if they do agree, any existing error count is decremented and the calculated value is used. Hence, over successive cycles of measurement, a picture is built up of the reliability of the positional data. If the error count exceeds a certain value representative of, say, 5 consecutive calculations not agreeing, the control system can decide that it has lost synchronism with the real position of the rotor and shut down excitation of the machine before any more serious event occurs. The storage and extrapolation of the values can be done by any convenient means but typically by digital storage in memory locations. It has been found that using n=8 gives a good compromise between system stability and storage requirements. In an alternative implementation eight stored values are used for position and sixty-four are used for speed.

Step 57 determines the next reference position, i.e. the position on a phase at which the next set of measurements will be taken. According to the prior art, having determined the angular position of the rotor to an acceptable accuracy, and knowing from the history of times, positions and speed, step 58 would then calculate the time at which the next reference position on the next phase would be reached. This time was stored and the controller looped back to step 51 to wait till the stored time has elapsed and the measurements are taken at the next reference position.

It will be seen that, by following the prior art routine, successive measurements were taken at adjacent reference points. For example, referring to FIG. 5, if the measurements have just been completed on Phase A at the rotor angle Ref A, step 57 in FIG. 7 sets Ref B as the next reference position. It will be realized that the flux linkage and current measurements must be taken sufficiently close to the reference angle that the position error is small, or else the system becomes unstable and loses control.

Since the calculations take a finite time, there is clearly a limit on the operating speed using this method. For example, for a 3-phase machine with 12 stator poles and 8 rotor poles, there are 8 phase inductance periods in one revolution of the rotor. Using a typical low-cost microprocessor which would be appropriate for, say, a domestic appliance or an automotive application, the cycle time of the calculations would be around 0.3 msec, corresponding to a per-phase cycle time of 0.9 msec. At a speed of 4000 rev/min, the phase inductance period would be traversed in 1.88 msec. To ensure stable running, a significant difference is required between these two cycle times: typically a speed limit between 3000 and 3500 rev/min would be imposed to prevent maloperation. Previously, this has been thought to be the limit of operation for such a sensorless position detection system. While it is possible to raise the speed limit for machines which have fewer rotor poles (and hence longer phase inductance periods), this solution may not be available because other parts of the machine specification require the larger number of poles. Another solution would be to use a faster processor, but this increases the cost of the controller.

The invention allows operation at higher speeds regardless of the number of poles on the rotor. After step 57 is completed, the speed is tested at step 59 to find which of several predetermined ranges it falls into. This is done in the processor by comparing the speed value determined in step 56 with various appropriate speed ranges. In this example, the machine has 3 phases and the rotor has 8 poles, and three speed ranges are chosen. These ranges could be <3500 rev/min, 3500 to 7000 rev/min, and >7000 rev/min. For other machines with different phase and pole numbers, different ranges could be chosen. There is no theoretical limit to the number of different ranges which can be incorporated. It may also be found appropriate to incorporate into step 59 some hysteresis effect so that the ranges actually overlap to cope with any speed fluctuations around the boundaries between the speed ranges.

If the speed has been determined by step 59 to fall into Range 1, control passes straight through to step 58 as before so that the next reference position after Ref A is Ref B and so on. If the speed is determined to fall into the next higher range, control passes to step 60 which adds a third of a cycle to the reference position. From FIG. 5, it will be seen that this moves the new reference position to reference position Ref C on Phase C. This effectively doubles the time available for the calculations for the new position to take place, and doubles the speed limit for a given processing speed. With the additional third of a phase angle added to each reference position it will be seen that on successive cycles the reference positions are then on Phase A, Phase C, Phase B, Phase A . . . , i.e. on every second phase, while the machine speed remains in Range 2. While the phases are all used for interrogation, the sequence and frequency of interrogation differs from the sequence and frequency of the excitation of the phases.

Figure 5:
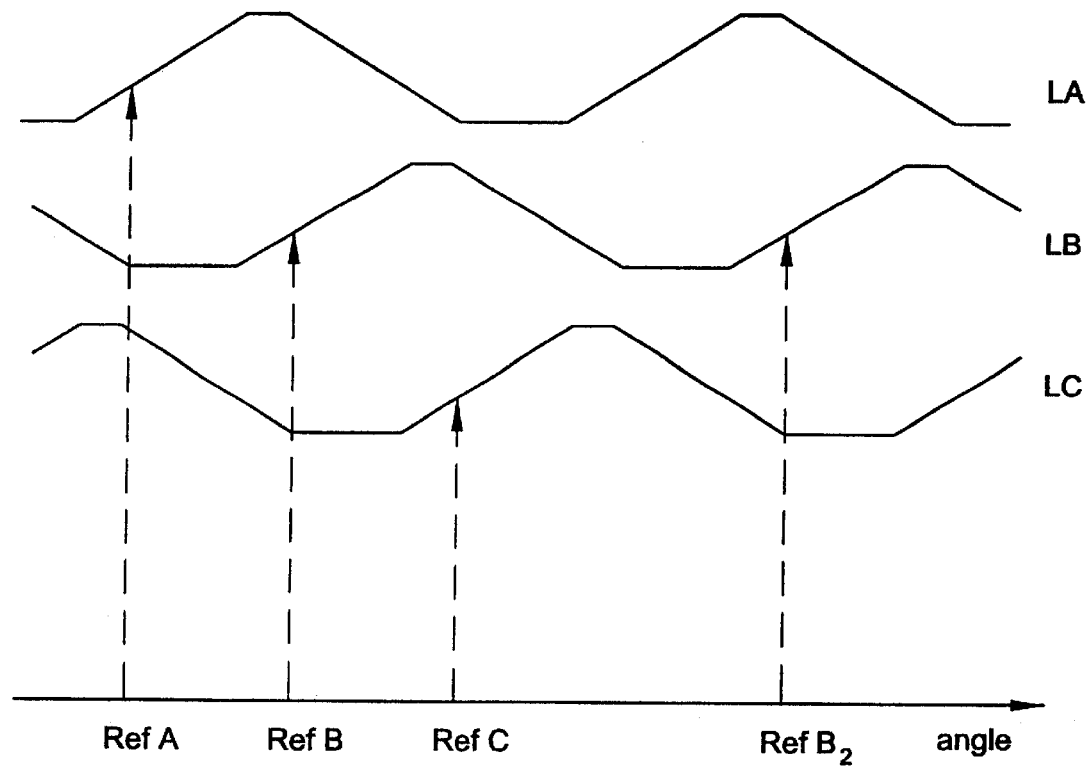
FIG. 5 shows the idealized inductance profiles and possible reference angle positions for a machine operated according to the invention in single-pulse mode.

If the speed is higher still and is determined to fall into Range 3, step 61 is executed and the reference position is increased by one complete cycle, i.e. to Ref $B_2$ in FIG. 5 instead of Ref B. This has the effect of moving to a reference point which allows four times the swept rotor angle and, therefore, calculation time. This raises the speed limit by a factor of four. In this mode of operation, the sequence of reference points is Phase A, Phase B, Phase C, . . . , but the frequency is one quarter of the original. All phases, however, are used for interrogation in the order of phase excitation.

It will be realized that other amounts could be added to the reference point by Steps 60 and 61. The amount will depend on the characterization data for the machine in question, as described below.

If the characterization data stored in the look-up table 42 refers to the average values anticipated in the machine, then it is appropriate to interrogate each phase in turn. For example, adding two complete cycles would allow a factor of 7 to be applied to the speed limit. However, the preferred embodiment is to add either $1/n$ cycle for an n phase machine (where n is a non-zero positive integer) or whole cycles, since these are additions which will result in all the phases being used in turn for interrogation, thus averaging out the effects of parameter variation between the phases and giving a reliable position indication.

Where the stored characterization data refers only to a particular phase of the machine, it is appropriate to interrogate only that phase. In this case only whole cycles would be added to the reference point.

In general terms, the equation for the number of reference positions skipped, P, is:

$$P=Cn+m$$

Where n=number of phases in the machine
m is a positive integer less than n
C is an integer $\geq 0$ representing whole cycles of inductance
For example,
m=1; C=0; n=3: Skips 1 position, e.g. A to C
m=2; C=0; n=3: Skips 2 positions, e.g. A to A
m=0; C=1; n=3: Skips 3 positions, e.g. A to $B_2$
Thus it is clear that the invention is generally applicable over a wide range of control regimes and phase numbers.

The above embodiments of the invention utilise a fixed reference position in each phase conduction cycle so that the determination of the rotor position is put into effect with reference to the same angular reference but not necessarily in an adjacent phase. However, it is possible to establish more than one reference position in the same phase so that a more graded choice of reference position at which to determine rotor position is available.

It will be realized that, while the above examples have been described in relation to a three-phase machine, the invention can be applied to any polyphase switched reluctance machine with any number of poles. Similarly, the invention could be applied to a linear machine where the moving part (often referred to as a "rotor") travels linearly. Thus, the skilled person will appreciate that variation of the disclosed arrangements are possible without departing from the invention. Accordingly, the above description of several embodiments is made by way of example and not for the purposes of limitation. The present invention is intended to be limited only by the spirit and scope of the following claims.

What is claimed is:

1. A method of rotor position detection for a switched reluctance machine having a rotor, a stator and a plurality of phase windings, the rotor being movable relative to the stator according to a cyclic variation of magnetic properties of each phase, the method comprising:

defining a reference position of the rotor relative to the stator in each cyclic variation of the magnetic properties;

sampling at least one characteristic of the machine at an estimate of the time of reaching one of the reference positions;

deriving a rotor position from the sampled characteristic(s); and advancing the rotor beyond a subsequent reference position and sampling the at least one characteristic again to allow further time for a subsequent derivation of the rotor position;

wherein said one reference position is in one phase and said subsequent reference position is in another phase of the switched reluctance machine.

2. A method as claimed in claim 1 in which the advance is an integer number of reference positions.

3. A method as claimed in claim 1 in which the at least one sampled characteristic is used to provide signals indicative of phase current and flux linkage in a corresponding phase winding.

4. A method as claimed in claim 1 in which the at least one sampled characteristic comprises phase current and voltage applied across the corresponding winding.

5. A method as claimed in claim 1, including detecting rotor speed from the sampled characteristic(s).

6. A method as claimed in claim 1, including:

defining a set of speed ranges for the rotor, including a low speed range and at least a first high speed range;

determining into which speed range the rotor speed falls; and advancing the rotor beyond the subsequent reference position if the rotor speed falls outside the low speed range.

7. A method as claimed in claim 6 in which the value of the advance beyond the subsequent reference position is a fraction of one phase inductance cycle.

8. A method as claimed in claim 7 in which the fraction is $m/n$ where n is the number of phases and m is an integer less than n.

9. A method as claimed in claim 6 in which the set of speed ranges includes a second high speed range, the value of the advance beyond the subsequent reference position being one or more phase inductance cycles.

10. A method of rotor position detection for a switched reluctance machine having a rotor, a stator and a plurality of phase windings, the rotor being movable relative to the stator according to a cyclic variation of magnetic properties of each phase, the method comprising:

defining a reference position of the rotor relative to the stator in each cyclic variation of the magnetic properties;

sampling at least one characteristic of the machine at an estimate of the time of reaching one of the reference positions;

deriving a rotor position from the sampled characteristic(s);

advancing the rotor beyond a subsequent reference position and sampling the at least one characteristic again to allow further time for a subsequent derivation of the rotor position;

defining a set of speed ranges for the rotor, including a low speed range and at least a first high speed range;

determining into which speed range the rotor speed falls; and advancing the rotor beyond the subsequent reference position if the rotor speed falls outside the low speed range.

11. A method as claimed in claim 10 in which the value of the advance beyond the subsequent reference position is a fraction of one phase inductance cycle.

12. A method as claimed in claim 11 in which the fraction is $m/n$ where n is the number of phases and m is an integer less than n.

13. A method as claimed in claim 10 in which the set of speed ranges includes a second high speed range, the value of the advance beyond the subsequent reference position being one or more phase inductance cycles.

14. A switched reluctance machine system including:

a stator having a plurality of phase windings;

a rotor movable relative to the stator; and a controller programmed with a reference position of the rotor relative to the stator in each cyclic variation of the magnetic properties of each phase of the machine, the controller having means for deriving a rotor position from at least one sampled characteristic of the machine; and means for sampling the at least one characteristic of the machine at an estimate of the time of reaching one of the reference positions, the controller further being operable to advance the rotor beyond a subsequent reference position and to enable the means for sampling thereafter to allow further time for subsequent derivation of the rotor position;

wherein said one reference position is in one phase and said subsequent reference position is in another phase of the switched reluctance machine.

15. A system as claimed in claim 14 including means for deriving the rotor speed from the at least one sampled characteristic.

16. A system as claimed in claim 14 including means for determining into which of a low speed range and at least a first high speed range the rotor speed falls, the controller being operable to advance the rotor beyond the subsequent reference position if the rotor speed falls outside the low speed range.

17. A system as claimed in claim 16 in which the means for determining is operable to allocate the determined rotor speed into a first high speed range, the controller being operable to advance the rotor beyond the subsequent reference position by a fraction of the phase inductance cycle.

18. A system as claimed in claim 17 in which the fraction is $m/n$ where n is the number of phases and m is a positive integer less than n.

19. A system as claimed in claim 16 in which the means for determining is operable to allocate the determined rotor speed into a second high speed range, the controller being operable to advance the rotor beyond the subsequent reference position by one or more phase inductance cycles.

20. A switched reluctance machine system including:
   a stator having a plurality of phase windings;
   a rotor movable relative to the stator; and
   a controller programmed with a reference position of the rotor relative to the stator in each cyclic variation of the magnetic properties of each phase of the machine, the controller having means for deriving a rotor position from at least one sampled characteristic of the machine;
   means for sampling the at least one characteristic of the machine at an estimate of the time of reaching one of the reference positions, the controller further being operable to advance the rotor beyond a subsequent reference position and to enable the means for sampling thereafter to allow further time for subsequent derivation of the rotor position; and
   means for determining into which of a low speed range and at least a first high speed range the rotor speed falls, the controller being operable to advance the rotor beyond the subsequent reference position if the rotor speed falls outside the low speed range.

21. A system as claimed in claim 20 in which the means for determining is operable to allocate the determined rotor speed into a first high speed range, the controller being operable to advance the rotor beyond the subsequent reference position by a fraction of the phase inductance cycle.

22. A system as claimed in claim 21 in which the fraction is $m/n$ where n is the number of phases and m is a positive integer less than n.

23. A system as claimed in claim 20 in which the means for determining is operable to allocate the determined rotor speed into a second high speed range, the controller being operable to advance the rotor beyond the subsequent reference position by one or more phase inductance cycles.

24. A switched reluctance machine system including:
   a stator having a plurality of phase windings;
   a rotor movable relative to the stator; and
   a controller programmed with a reference position of the rotor relative to the stator in each cyclic variation of the magnetic properties of each phase of the machine, the controller deriving a rotor position from at least one sampled characteristic of the machine; and
   a sampler for sampling the at least one characteristic of the machine at an estimate of the time of reaching one of the reference positions, the controller further being operable to advance the rotor beyond a subsequent reference position and to enable the sampler thereafter to allow further time for subsequent derivation of the rotor position;
   wherein said one reference position is in one phase and said subsequent reference position is in another phase of the switched reluctance machine.

* * * * *